(12) United States Patent
Shapiro et al.

(10) Patent No.: US 6,230,286 B1
(45) Date of Patent: May 8, 2001

(54) COMPUTER SYSTEM FAILURE REPORTING MECHANISM

(75) Inventors: Robert Shapiro, Portland; Paul Andrew Dorwin, Beaverton, both of OR (US)

(73) Assignee: Siemens Information and Communication Products LLC, Austin, TX (US)

(*) Notice: Subject to any disclaimer, the term of this patent is extended or adjusted under 35 U.S.C. 154(b) by 0 days.

(21) Appl. No.: 08/408,127

(22) Filed: Mar. 21, 1995

Related U.S. Application Data

(63) Continuation of application No. 07/983,719, filed on Jan. 28, 1993, now abandoned.

(51) Int. Cl.[7] .................................................. G06F 11/14
(52) U.S. Cl. ........................................................... 714/23
(58) Field of Search .................. 395/185.01, 184.01, 395/183.2, 185.1

(56) References Cited

U.S. PATENT DOCUMENTS

| | | | | |
|---|---|---|---|---|
| 4,503,535 | * | 3/1985 | Buddle et al. | 371/11.1 |
| 4,518,822 | * | 5/1985 | Martinez | 340/311.1 |
| 4,665,501 | * | 5/1987 | Saldin et al. | 364/900 |
| 4,695,946 | * | 9/1987 | Andreasen et al. | 364/200 |
| 4,701,845 | * | 10/1987 | Andreasen et al. | 371/18 |
| 4,866,712 | * | 9/1989 | Chao | 371/5.5 |
| 4,903,321 | * | 2/1990 | Hall et al. | 455/34 |
| 4,910,666 | * | 3/1990 | Nibby, Jr. et al. | 364/200 |
| 4,914,576 | * | 4/1990 | Zelley et al. | 364/200 |
| 5,029,169 | * | 7/1991 | Smyk | 371/19 |
| 5,243,601 | * | 9/1993 | Tague et al. | 371/16.1 |
| 5,257,384 | * | 10/1993 | Farrand et al. | 395/725 |
| 5,274,797 | * | 12/1993 | Barlow et al. | 395/575 |
| 5,276,863 | * | 1/1994 | Heider | 395/575 |
| 5,287,461 | * | 2/1994 | Moore | 395/275 |
| 5,303,267 | * | 4/1994 | Gupta | 375/38 |
| 5,317,752 | * | 5/1994 | Jewett etal. | 395/750 |
| 5,339,406 | * | 8/1994 | Carney et al. | 395/575 |
| 5,452,454 | * | 9/1995 | Basu | 395/700 |

\* cited by examiner

*Primary Examiner*—Albert De Cady

(57) ABSTRACT

A mechanism is provided for a failed computer system to send a report of the failure to a remote site without dependency on a service processor or maintenance processor. The computer system is capable of reporting system failure to a remote site independent of whether the system may be successfully rebooted. The system includes a CPU, and, coupled to the CPU, a non-volatile control store, a main memory, a storage device storing a computer operating system, and a data modem. Firmware is resident in the non-volatile control store of the main computer system for reporting system failure to a remote site independent of whether the system may be successfully rebooted by reloading the operating system into main memory. The firmware is invoked upon occurrence of a non-recoverable error and provides for assembling failure-related information, establishing communication with the remote site, and transmitting the failure-related information to the remote site.

4 Claims, 3 Drawing Sheets

COMPUTER SYSTEM FAILURE REPORTING MECHANISM

This application is a continuation of application Ser. No. 07/983,719, filed Jan. 28, 1993 now abandoned.

BACKGROUND OF THE INVENTION

1. Field of the Invention

The present invention relates to computer system maintenance and diagnostics and more particularly to computer system failure reporting mechanisms for reporting system failure to a remote site.

2. State of the Art

Much of the world's day-to-day business relies on sophisticated computer systems used in such fields as finance, securities exchange, telecommunications, medicine, and retailing. Reliability and maintainability are vital concerns in such applications, since any down time may result not only in tremendous inconvenience but also significant monetary loss. Vendors of such computer systems have therefore developed maintenance and diagnostic facilities as part of the computer system and have established customer assistance centers to provide customer support. When a system failure occurs, diagnostic software tries to determine the cause of the failure and sends analysis results to the customer assistance center. In the prior art, reporting mechanisms of the type described have typically been required to run under the computer operating system, such that if a failure occurs, the system must be able to be successfully rebooted before failure reporting can be performed. To ensure that the system can be successfully rebooted, redundant boot paths have been provided. That is, multiple independent copies of the operating system have been stored on different storage devices independently accessible by the computer system such that if the operating system cannot be reloaded from one of the storage devices, then it may hopefully be reloaded from another of the storage devices. Despite such precautions, failures do occur that prevent the system from being successfully rebooted. In order to minimize down time, a mechanism is needed for reporting such failures. Such a mechanism would allow a "dead" system to "call home"; that is, allow a system that cannot be successfully rebooted to send a report to a remote service center.

SUMMARY OF THE INVENTION

The present invention, generally speaking, provides a mechanism for a failed computer system to send a report of the failure to a remote site. The computer system is capable of reporting system failure to a remote site independent of whether the system may be successfully rebooted. The system includes a CPU, and, coupled to the CPU, a non-volatile control store, a main memory, a storage device storing a computer operating system, and a data modem. Firmware is resident in the non-volatile control store for reporting system failure to a remote site independent of whether the system may be successfully rebooted by reloading the operating system into main memory. The firmware is invoked upon occurrence of a non-recoverable error and provides for assembling failure-related information, establishing communication with the remote site, and transmitting the failure-related information to the remote site.

DETAILED DESCRIPTION OF THE PREFERRED EMBODIMENTS

Figure 1:
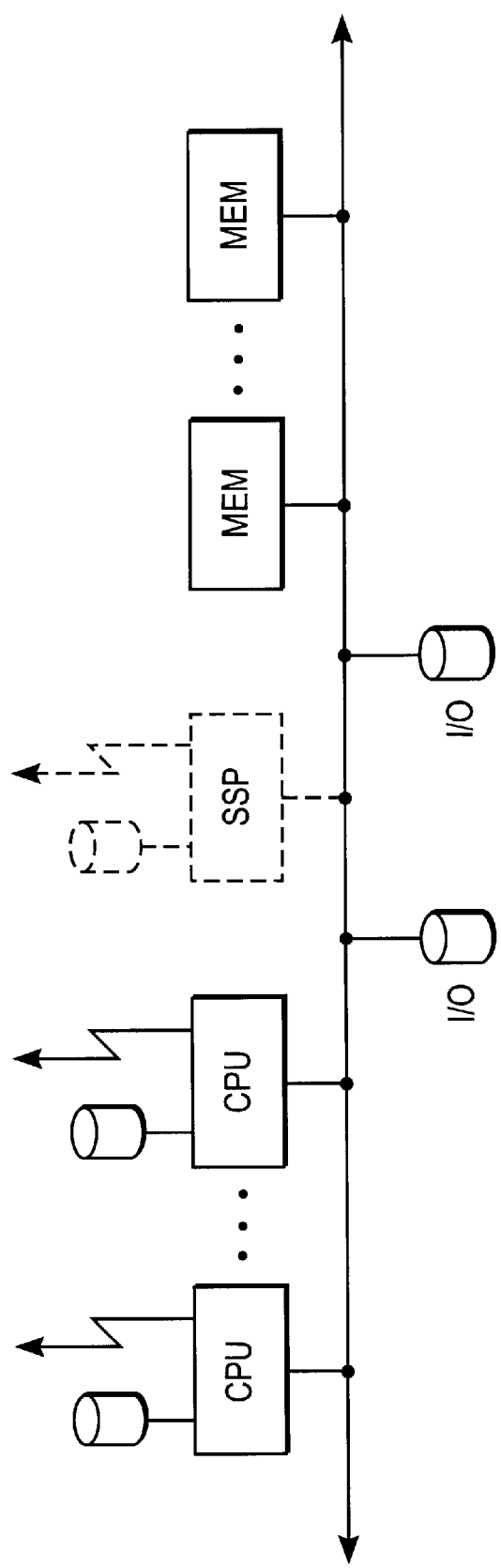
FIG. 1 is a block diagram of a computer system.

Referring now to FIG. 1, in a typical configuration of a computer of the type described, multiple CPUs and multiple memory modules are connected to a common bus. Also connected to the bus are I/O devices. The system may also include a system support processor (SSP). In the configuration as shown, each CPU is assumed to be equipped with a modem and with its own file storage device for storing a copy of the operating system.

Figure 2:
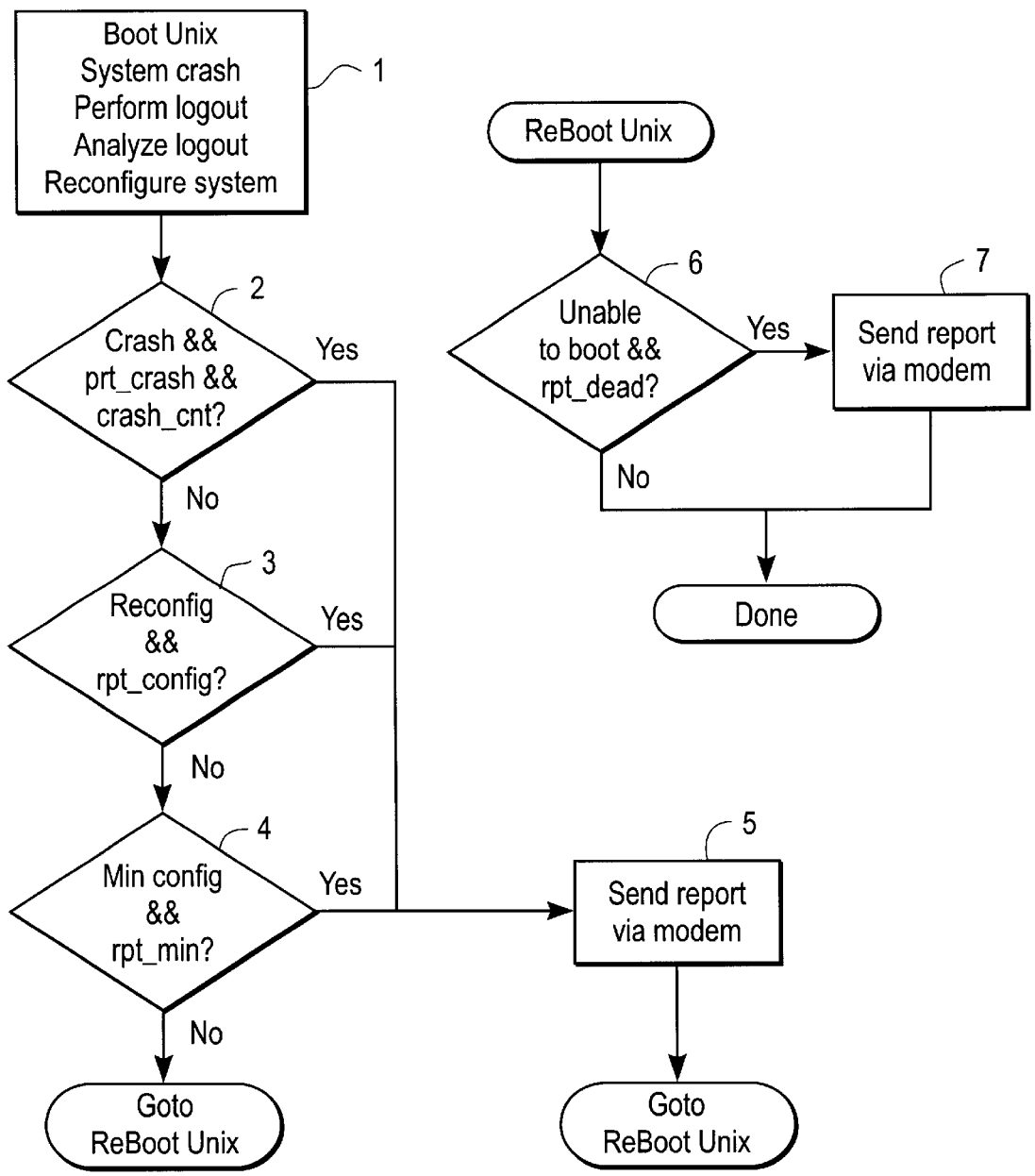
FIG. 2 is a flowchart of a remote reporting facility.

Referring now to FIG. 2, reporting flow according to an exemplary embodiment of the invention will be described. It should be understood, however, that other reporting flows may be used to suit the needs of a particular system or user, the common feature among such various reporting flows being that a failure report may be sent via modem to a remote site independent of whether the system is able to be rebooted.

In step 1 of FIG. 2, the system is assumed to have been booted and to be successfully running UNIX (or some other computer operating system) at the time of occurrence of a system crash. By system crash is meant the occurrence of an unrecoverable error requiring return of the system to a known initial state, i.e., rebooting. When an unrecoverable error is detected, a Logout Auto Reboot (LAR) firmware routine stored in PROM within each CPU is invoked. Logout provides a graceful way of bringing the system down and placing it in a state to be brought up. For example, during Logout, hardware and software state information is collected, including information regarding possible faults. After Logout has been performed, Logout results are analyzed to determine the cause of failure, and the system is reconfigured if possible to remove the failed device from the system. For example, a CPU board might fail, in which case the system would be reconfigured to remove the failed CPU board from the system.

Rather than automatically generating a report to the remote site upon each failure occurrence, the user is able to specify with some particularity under what circumstances a report should be generated. As shown in step 2, the user may specify that crashes are not to be reported (rpt_crash=0) or that each crash after a specific number of crashes (crash_cnt) is to be reported (rpt_crash=1). If crashes are to be reported and the crash count has been reached, then a report is generated and sent via modem in step 5. If crashes are not to be reported or the crash count has not been reached, then the reporting flow passes to step 3. In similar manner as with crashes, the user may specify whether reconfiguration is to be reported. If reconfiguration is performed and a rpt_config flag is set, then a report is generated and sent via modem to the remote site. Otherwise, the reporting flow passes to step 4. Rather than reporting each reconfiguration, the user may specify that a report is to be generated and sent via modem only when a minimum system configuration has been reached. If the minimum configuration has been reached and the rpt_min flag is set, then a report is generated and sent via modem. Otherwise, a reboot process is begun. If a failure report is to be generated and sent in accordance with any of the foregoing decisions, the report is first generated and sent and then a reboot process is entered. The decision steps described may be modified or arranged in different sequences.

When reboot is attempted following the previously described steps, if the system cannot be successfully rebooted, then the system is "dead", i.e., inoperable. In the prior art, a dead system has been unable to "call home" (i.e., send a failure report via modem) because generation and transmission of the failure report has required use of the operating system. In the presently described system, on the other hand, the LAR firmware is resident in PROM and may be executed independently of whether the system may be rebooted. In similar manner as previously described, the user may specify whether or not a dead system is to be reported (step 6). If so, a report is generated and sent via modem (step 7). Otherwise, the reporting flow is complete.

Figure 3:
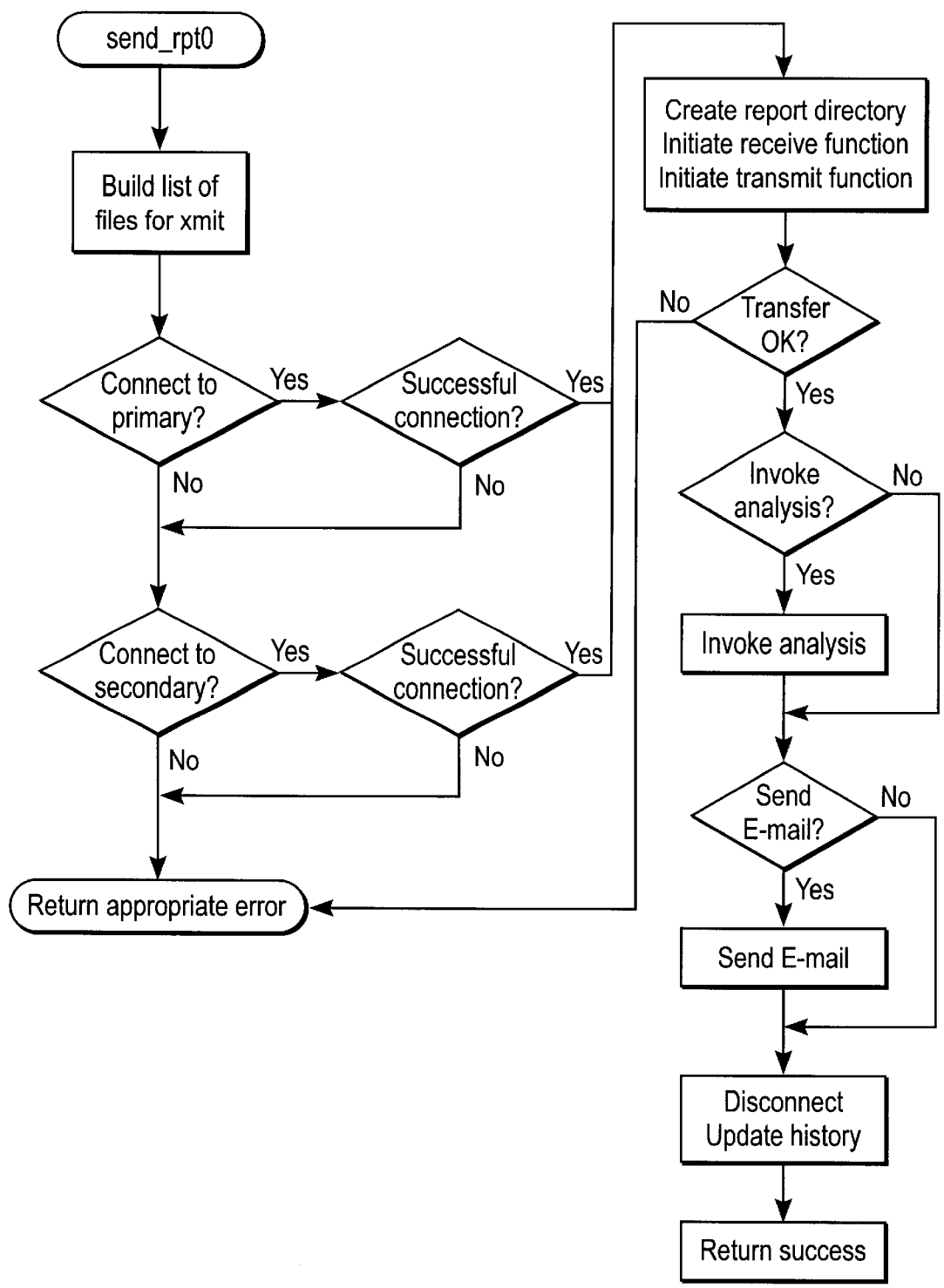
FIG. 3 is a flowchart of interaction between the remote reporting facility and a remote host system.

FIG. 3 illustrates in greater detail the reporting sequence. First, a list is built of files to be transmitted. In a preferred embodiment, the files transmitted include a LAR customer specification file, a LAR history file, and a Logout file. In general, the LAR customer specification file specifies when, how and under what circumstances reboot is to be performed. For example, the LAR customer specification file stores information concerning the minimum system configuration with which reboot will be attempted. The LAR history file contains bit maps specifying what resources are present in the system, which of the resources have been disabled and which of the resources have been determined to be bad. The file also specifies a particular boot path used in the reboot attempt. The Logout file contains various configuration and status information collected from system hardware and software resources.

In a user specification for remote reporting, a pre-defined, user-configurable structure including various flags and variables is stored. Information stored in the user specification includes, in addition to the conditions under which a report is to be generated, described previously, information concerning a primary remote site to which the report is to be sent and a secondary remote site to which the report is to be sent if the primary site cannot be reached for some reason. Also included is information specifying the appropriate modem parameters to be used. These parameters are user configurable, allowing for international remote reporting. After the list of files for transmission has been built, connection to the primary site is then attempted. If the connection attempt is unsuccessful, then connection to the secondary site is then attempted. If this connection attempt is also unsuccessful, then an appropriate error message is returned. Phone numbers and other information concerning the primary and secondary sites is included in the user specification for remote reporting.

Assuming connection to either the primary or secondary site is successfully achieved, then a report directory is created. When a report is sent to the host, it will be saved under a directory structure as follows:

- ~/rmt_rpt/System_name/
  - Report_name1/
    - Report_files
  - Report_name2/
    - Report_files The value of System_name is specified in the configuration file. The value of Report_name may be the date and time of the report.

The receive and transmit functions are then initiated. The system transmits to the remote site the files listed in the list of files for transmission. Alternatively only notification of the failure may be sent to the remote site, after which the remote site may dial back in to collect specific desired files. Or, in the case of a secure site that cannot be dialled into reporting may be achieved by communication via pager. In the latter case, the modem simply dials a pager number, thereby notifying the responsible party that a failure has occurred.

If an error occurs during transfer, an appropriate error message is returned. Otherwise, a decision is made whether to invoke an analysis option in which the local system performs limited analysis of Logout data in an attempt to determine the cause of the system failure. Whether or not analysis is invoked may be specified in the user specification for remote reporting. More extensive analysis may be performed at the remote site once a report has been sent.

If analysis is invoked and the fault is detected, a report detaining the fault and a possible solution may be E-mailed to the group responsible for system support of the remote site. Whether an E-mail message is sent may be specified in the user specification for remote reporting. Even if analysis is not invoked, it will usually be desirable to send an E-mail message to an entity specified in the configuration information. The E-mail message will specify the name of the failed system and the name of the report sent, so that the entity receiving the E-mail will be able to find the report.

The system and the remote site are then disconnected, and a remote reporting history is updated. As reports are sent to the host, a remote history file is created on the local system (or updated) to reflect the time of the report, the type of the report, where the report was sent to, and the files transmitted with the report. This file is kept on the local system diagnostic media.

The foregoing has described in detail an automated dead system reporting mechanism. The reporting mechanism sends a number of error data files to a remote site via a modem. Once the files have been transferred, an automated analysis program may be run to determine the fault. Once the fault has been detected, a report detailing the fault and possible solutions may be E-mailed to the group responsible for system support. A dead system may be reported by virtue of the fact that the reporting mechanism is implemented as PROM-resident firmware that may be invoked independent of whether the system may be successfully rebooted.

The principles, preferred embodiments and modes of operation of the present invention have been described above; however, the invention should not be construed as limited to the particular embodiments discussed. Instead, the above described embodiments should be regarded as illustrative rather than restrictive, and it should be appreciated that variations may be made in those embodiments by workers skilled in the art without departing from the scope of the present invention as defined by the following claims.

What is claimed is:

1. A method of reporting complete failure of a computer system to a remote site without requiring the system to be successfully rebooted, the computer system running an computer operating system, the method comprising the steps of:
   - the computer operating system determining that a non-recoverable system error currently exists;
   - the operating system invoking a firmware mechanism within the computer system;
   - the firmware mechanism attempting to reboot said system; and
   - the firmware mechanism, if the system cannot be rebooted, sending to a remote location notification of system failure.

2. The method of claim 1 wherein sending notification comprises establishing a data connection with a remote site.

3. The method of claim 1 wherein sending notification comprises causing a paging message to be sent.

4. A error-reporting method implemented by a computer system including a central processor and running a computer operating system, said method comprising the steps of:

said operating system determining that a non-recoverable error condition currently exists that requires rebooting of the operating system;

said operating system causing a firmware routine stored in a static storage medium accessible to said central processor;

said firmware routine, if rebooting cannot be successfully performed, performing the steps of:

establishing a communications link to a remote location; and sending an error message over the communications link to the remote location.

* * * * *